No. 734,733. PATENTED JULY 28, 1903.
J. H. MOSS.
CLUTCH.
APPLICATION FILED JAN. 28, 1902.
NO MODEL. 4 SHEETS—SHEET 1.

WITNESSES: INVENTOR
John H. Moss
BY
ATTORNEY

No. 734,733. PATENTED JULY 28, 1903.
J. H. MOSS.
CLUTCH.
APPLICATION FILED JAN. 28, 1902.
NO MODEL. 4 SHEETS—SHEET 2.

WITNESSES: John H. Moss INVENTOR
Samuel E. Dimmick
Henry Kohl
BY
C. Moss
ATTORNEY No. 734,733. PATENTED JULY 28, 1903.
J. H. MOSS.
CLUTCH.
APPLICATION FILED JAN. 28, 1902.
NO MODEL. 4 SHEETS—SHEET 3.

WITNESSES: John H. Moss INVENTOR

BY

ATTORNEY

No. 734,733. PATENTED JULY 28, 1903.
J. H. MOSS.
CLUTCH.
APPLICATION FILED JAN. 28, 1902.
NO MODEL. 4 SHEETS—SHEET 4.
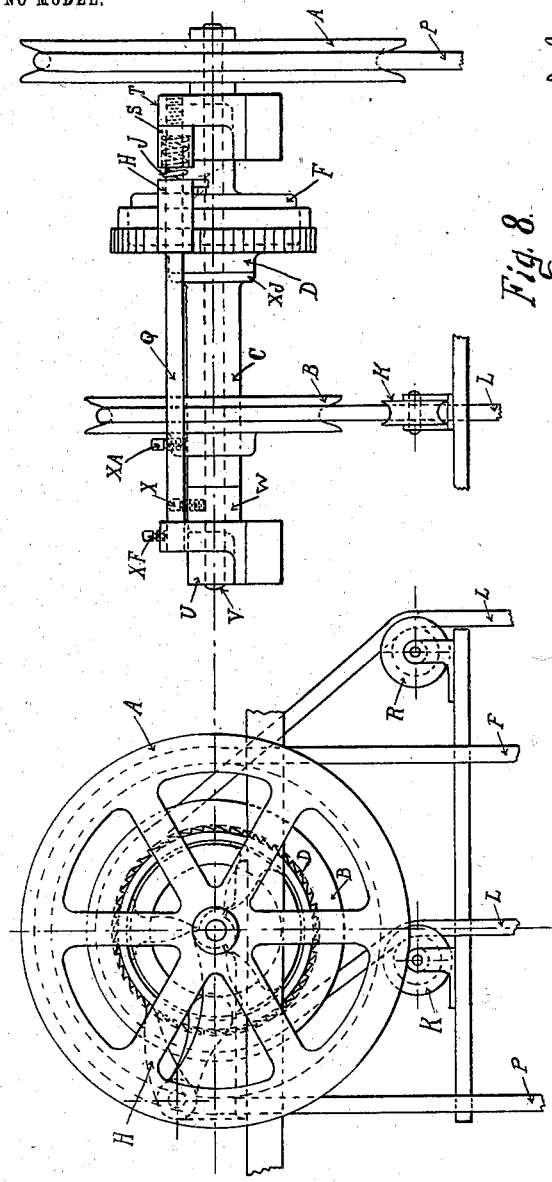
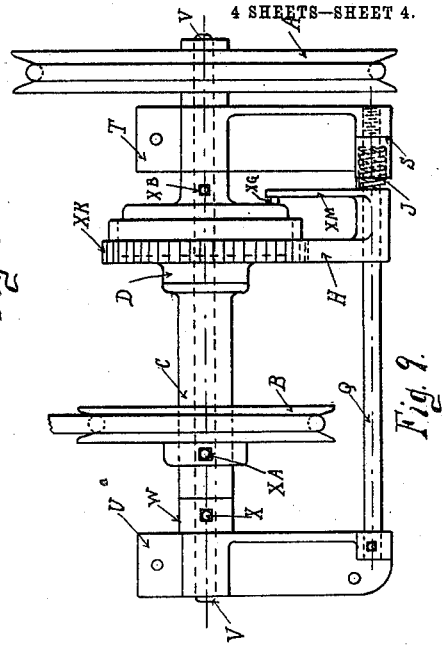
WITNESSES:
Samuel E. Dimmick
Henry H. Kohl
John H. Moss INVENTOR
BY
C. B. Moss
ATTORNEY No. 734,733. Patented July 28, 1903.

UNITED STATES PATENT OFFICE.

JOHN H. MOSS, OF NEWBURGH, NEW YORK.

CLUTCH.

SPECIFICATION forming part of Letters Patent No. 734,733, dated July 28, 1903.

Application filed January 28, 1902. Serial No. 91,651. (No model.)

*To all whom it may concern:*

Be it known that I, JOHN H. MOSS, a citizen of the United States, residing at the city of Newburgh, in the county of Orange and State of New York, have invented certain new and useful Improvements in Clutches; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to friction-clutches in which dogs are employed to clamp a loose ratchet-ring.

The purpose of my invention is to provide a simple, strong, cheap, and durable clutching mechanism especially applicable to dumb-waiters and elevators.

Figure 1:
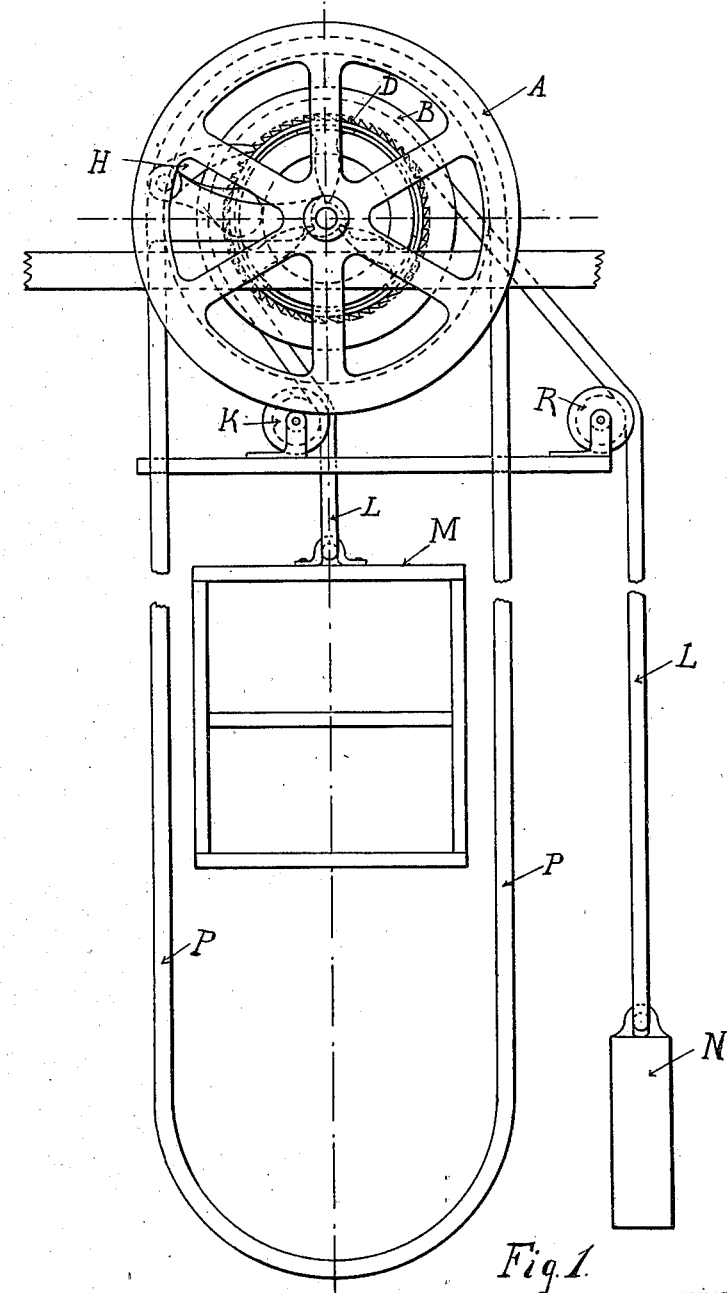
Figure 2:
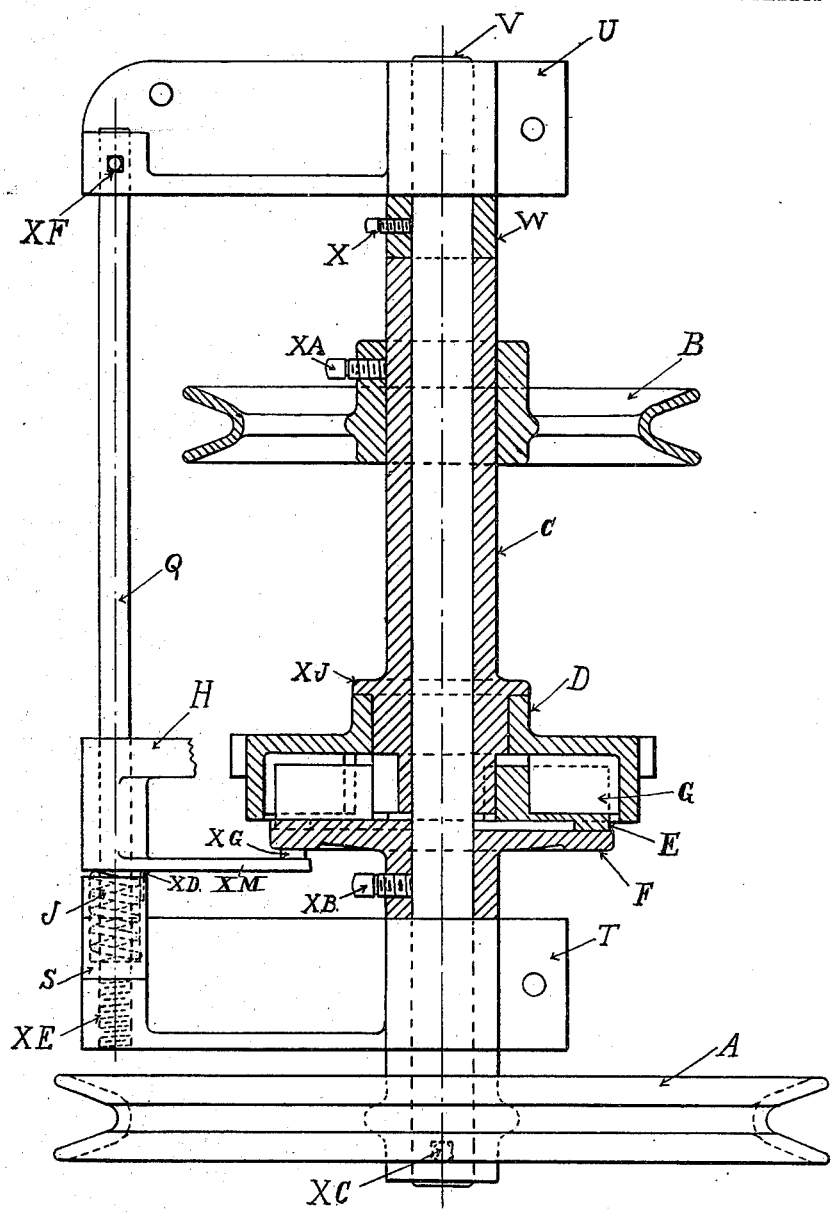
Figure 3:
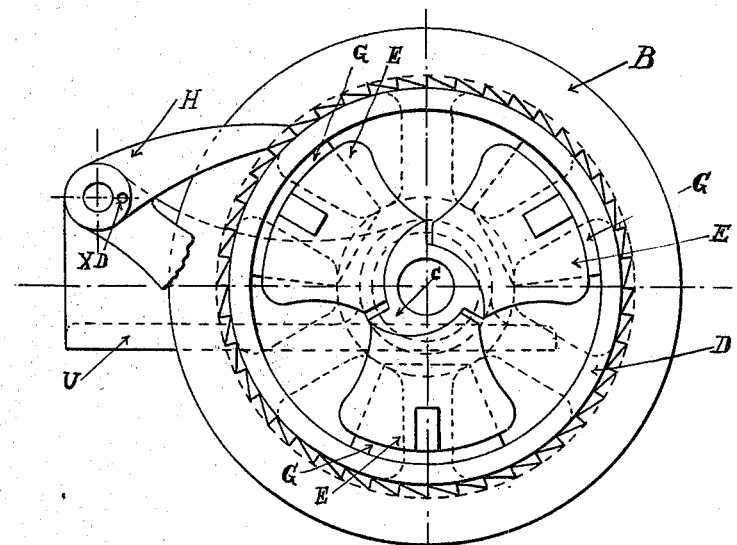
Figures 5, 6:
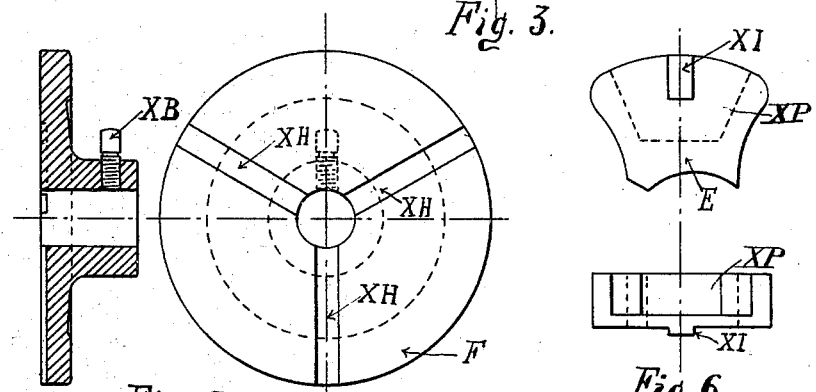
Figure 4:
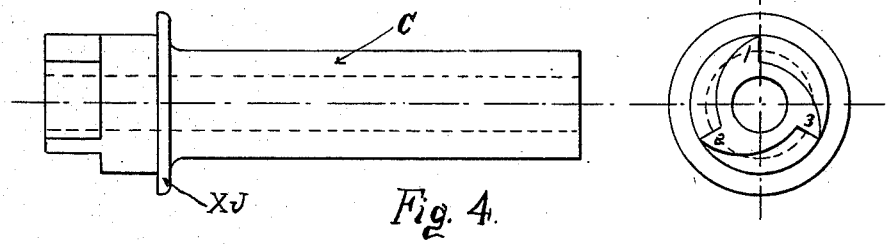

In the accompanying drawings, Figure 1 represents a side elevation of a dumb-waiter or elevator to which my improvements are applied. Fig. 2 represents a transverse section through the clutching mechanism. Fig. 3 represents an end view of the fly-cams, friction-dogs, and ratchet-ring. Fig. 4 represents a side view of the drum and cams. Fig. 5 represents an end and transverse view of the disk. Fig. 6 represents a side and top view of the friction-dogs. Fig. 7 represents an end view of the clutching mechanism in position. Fig. 8 represents a side view of the clutching mechanism. Fig. 9 represents a top view of the clutching mechanism.

The main shaft V, on which the clutching mechanism is mounted, rests on suitable bearings at the top of the well-hole or other suitable place where the mechanism may be employed. The drum C is mounted loosely on the main shaft V and is held in position by the collar W at one end and the disk F at the other. Mounted on the drum C is a sheave-pulley B, firmly attached to the drum by a set-screw XA and revolving with said drum. This sheave-pulley receives the rope L of the elevator-car M. The drum C is cast with a flange XJ, made integral therewith, and at the end there is also cast integral therewith a triple fly-cam 1, 2, and 3. Mounted loosely on the sleeve of the drum is a ratchet-ring D, inside of whose rim are placed the three friction-dogs E, resting loosely on the fly-cams 1, 2, and 3. Each of said dogs has cast integral therewith a lug XL, which engages in the slot XH in the disk F, and each of said dogs has a pocket XP, into which are set the friction-blocks G, made of wood. The disk F is firmly fastened to the main shaft V by a set-screw XB. Extending from the shaft-bearing U to the shaft-bearing T is a rod Q, carrying a pawl H, adapted to engage the teeth XK of the ratchet-ring D and preventing the latter from backward movement when the friction-dogs are pressed against its inner rim by the centrifugal action of the fly-cams against the friction-dogs. The pawl is lifted free from the ratchet-teeth by a device consisting of a short arm XM, attached to the pawl and having a leather shoe at the end XG, which overlaps the disk F, against whose vertical side it is pressed and kept in close contact therewith by a coil-spring J. The main shaft is also provided with a large sheave-pulley A for the reception of an endless hand-rope P, which is used for raising and lowering the elevator-car, as presently described. The rope L, which supports the elevator-car M, has attached to its other end a counterbalance N, somewhat heavier than the elevator-car when empty. This rope L passes over the pulleys K and R, thereby giving it a better hold on the sheave-pulley B.

Having described the preferred mode of constructing my device, I will now describe its operation.

Assuming that the car is loaded at the bottom of the well, a pull on the right-hand side of the rope P will cause the drum C and the whole clutching mechanism to rotate with the main shaft. The weight of the car will exert a downward pull on the drum, causing it to rotate, and the fly-cams will be pressed against the friction-dogs with a centrifugal movement, forcing them against the inner rim of the ratchet-ring, causing it to rotate with the drum, the pawl being lifted free of the ratchet-teeth, and by continuing the pull the car can be raised to the desired point. Upon ceasing the pull on the rope the weight of the car causes the drum to rotate backward and the pawl drops into the teeth of the ratchet, thereby holding the car stationary, the friction-dogs being jammed against the inner rim of the ratchet-ring. To lower the car, a pull on the left-hand side of the rope P causes the drum to rotate to the left, and the pressure of the fly-cams against the friction-dogs will be removed and they will become loose and rotate with the drum, leaving the ratchet-ring held stationary by the pawl engaged with its teeth. Thus by continuing the pull on the rope the car may be lowered to the desired point, when upon ceasing the pull the weight of the car will again cause the drum to rotate backward and the fly-cams will force the friction-dogs against the inner rim of the ratchet-ring, thus holding the car at any desired point.

I claim—

1. The combination of a shaft with a grooved disk made fast thereto, a drum with a flange and a triple fly-cam cast integral therewith made loose on said shaft, a sheave-pulley for the reception of the car-rope fastened to the drum, a ratchet-ring normally loose on the drum, three friction-dogs, with pockets having friction-blocks, normally resting loosely on the fly-cams and having lugs which engage the grooves of the disk, a pawl to engage the teeth of the ratchet-ring, means of limiting the movement of the ratchet-ring and the pulley, means for engaging and raising the pawl in the teeth of the ratchet-ring, substantially as described.

2. The herein-described clutch mechanism consisting of the combination with a drum mounted on a shaft with a grooved disk made fast thereto and having a flange and triple fly-cam made integral therewith and adapted to revolve with the shaft, of a ratchet-ring mounted loosely on the drum and with friction-dogs resting loosely on the fly-cams and adapted to engage the grooves of the disk and to bind against the inner rim of the ratchet-ring as the drum is revolved, substantially as described.

JOHN H. MOSS.

Witnesses:
 SAMUEL E. DIMMICK,
 HENRY KOHL.